United States Patent
Yasunaga

(10) Patent No.: US 8,305,664 B2
(45) Date of Patent: Nov. 6, 2012

(54) IMAGE FORMING APPARATUS AND DENSITY CORRECTING METHOD

(75) Inventor: Yutaka Yasunaga, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 819 days.

(21) Appl. No.: 12/434,722

(22) Filed: May 4, 2009

(65) Prior Publication Data

US 2009/0296174 A1 Dec. 3, 2009

(30) Foreign Application Priority Data

May 28, 2008 (JP) .................................. 2008-139212

(51) Int. Cl.
 *G03F 3/08* (2006.01)
(52) U.S. Cl. ......... 358/518; 358/1.9; 358/504; 358/526; 399/49
(58) Field of Classification Search .................. 358/1.9, 358/1.13, 1.18, 500, 501, 504, 518, 523, 358/524, 526; 382/162, 167; 399/49
See application file for complete search history.

(56) References Cited

U.S. PATENT DOCUMENTS

| | | | |
|---|---|---|---|
| 5,583,644 A | 12/1996 | Sasanuma et al. | |
| 5,610,639 A | 3/1997 | Takada et al. | |
| 5,859,933 A | 1/1999 | Sasanuma et al. | |
| 6,384,895 B1 | 5/2002 | Sawano | |
| 6,992,796 B1* | 1/2006 | Taka et al. | 358/1.9 |
| 8,059,286 B2* | 11/2011 | Yamada | 358/1.13 |
| 8,086,122 B2* | 12/2011 | Nakane | 399/49 |
| 2002/0027669 A1* | 3/2002 | Nagatomi et al. | 358/1.9 |
| 2005/0206928 A1* | 9/2005 | Itagaki | 358/1.9 |
| 2007/0064038 A1* | 3/2007 | Arai et al. | 347/19 |
| 2007/0091390 A1* | 4/2007 | Kimura et al. | 358/500 |
| 2008/0123121 A1* | 5/2008 | Sagimori | 358/1.9 |
| 2008/0127846 A1* | 6/2008 | Nagai | 101/365 |

(Continued)

FOREIGN PATENT DOCUMENTS

JP 02-212165 8/1990

(Continued)

OTHER PUBLICATIONS

Notification of Reasons for Refusal issued in the corresponding Japanese Patent Application No. 2008-139212 dated May 11, 2010, and an English Translation thereof.

Office Action (Notification of the First Office Action) dated Jan. 5, 2012, issued in the Chinese Patent Application No. 200910145221.7 and an English Translation thereof. (10 pages).

*Primary Examiner* — Kimberly A Williams
(74) *Attorney, Agent, or Firm* — Buchanan Ingersoll & Rooney PC

(57) ABSTRACT

An image forming apparatus, comprises: a plurality of color image forming units each forming an image for correction for each different color on a different paper to output a correction chart; an operation unit for accepting an input of density correction instruction information corresponding to each of the plurality of color image forming units based on the correction chart; a control unit for setting color of the image for correction according to the density correction instruction information input by the operation unit, generating the image for correction for the set color, and causing the image for correction to be formed on the paper by the color image forming unit in order to output the correction chart; and a density unevenness correction unit for correcting density unevenness of each pixel in a main scanning direction for each of the plurality of color image forming units based on the density correction unevenness information input by the operation unit.

22 Claims, 13 Drawing Sheets

U.S. PATENT DOCUMENTS

| | | |
|---|---|---|
| 2008/0159763 A1* | 7/2008 | Nakane .......................... 399/49 |
| 2008/0204812 A1* | 8/2008 | Moro ........................... 358/3.27 |
| 2009/0103122 A1* | 4/2009 | Horita et al. ................... 358/1.9 |
| 2009/0263150 A1* | 10/2009 | Fujimori et al. ................ 399/49 |
| 2010/0310265 A1* | 12/2010 | Fujimori et al. ................ 399/49 |
| 2011/0176155 A1* | 7/2011 | Toriyabe ........................ 358/1.9 |
| 2011/0286018 A1* | 11/2011 | Hashizume .................... 358/1.9 |

FOREIGN PATENT DOCUMENTS

| | | |
|---|---|---|
| JP | 06-198973 | 7/1994 |
| JP | 11-198452 | 7/1999 |
| JP | 2005-246646 A | 9/2005 |

* cited by examiner

FIG.4

| ADDRESS | NAME | INTENDED USE |
|---|---|---|
| 00h | MODE [1:0] | CORRECTION MODE (0: NO CORRECTION, 1: CORRECTION) |
| 01h | INIT [5:0] | INITIAL VALUE OF CORRECTION AMOUNT (TWO'S COMPLEMENT [5:0]; -32 TO +31) |
| 02h | DIF0 [6:0] | CORRECTION AMOUNT DIFFERENCE 0 (CODE [6]+ABSOLUTE VALUE [5:0]; -63 TO +63) |
| 03h | DIF1 [6:0] | CORRECTION AMOUNT DIFFERENCE 1 (CODE [6]+ABSOLUTE VALUE [5:0]; -63 TO +63) |
| 04h | DIF2 [6:0] | CORRECTION AMOUNT DIFFERENCE 2 (CODE [6]+ABSOLUTE VALUE [5:0]; -63 TO +63) |
| 05h | DIF3 [6:0] | CORRECTION AMOUNT DIFFERENCE 3 (CODE [6]+ABSOLUTE VALUE [5:0]; -63 TO +63) |
| 06h | DIF4 [6:0] | CORRECTION AMOUNT DIFFERENCE 4 (CODE [6]+ABSOLUTE VALUE [5:0]; -63 TO +63) |
| 07h | DIF5 [6:0] | CORRECTION AMOUNT DIFFERENCE 5 (CODE [6]+ABSOLUTE VALUE [5:0]; -63 TO +63) |
| 08h | DIF6 [6:0] | CORRECTION AMOUNT DIFFERENCE 6 (CODE [6]+ABSOLUTE VALUE [5:0]; -63 TO +63) |
| 09h | DIF7 [6:0] | CORRECTION AMOUNT DIFFERENCE 7 (CODE [6]+ABSOLUTE VALUE [5:0]; -63 TO +63) |
| ... | ... | ... |

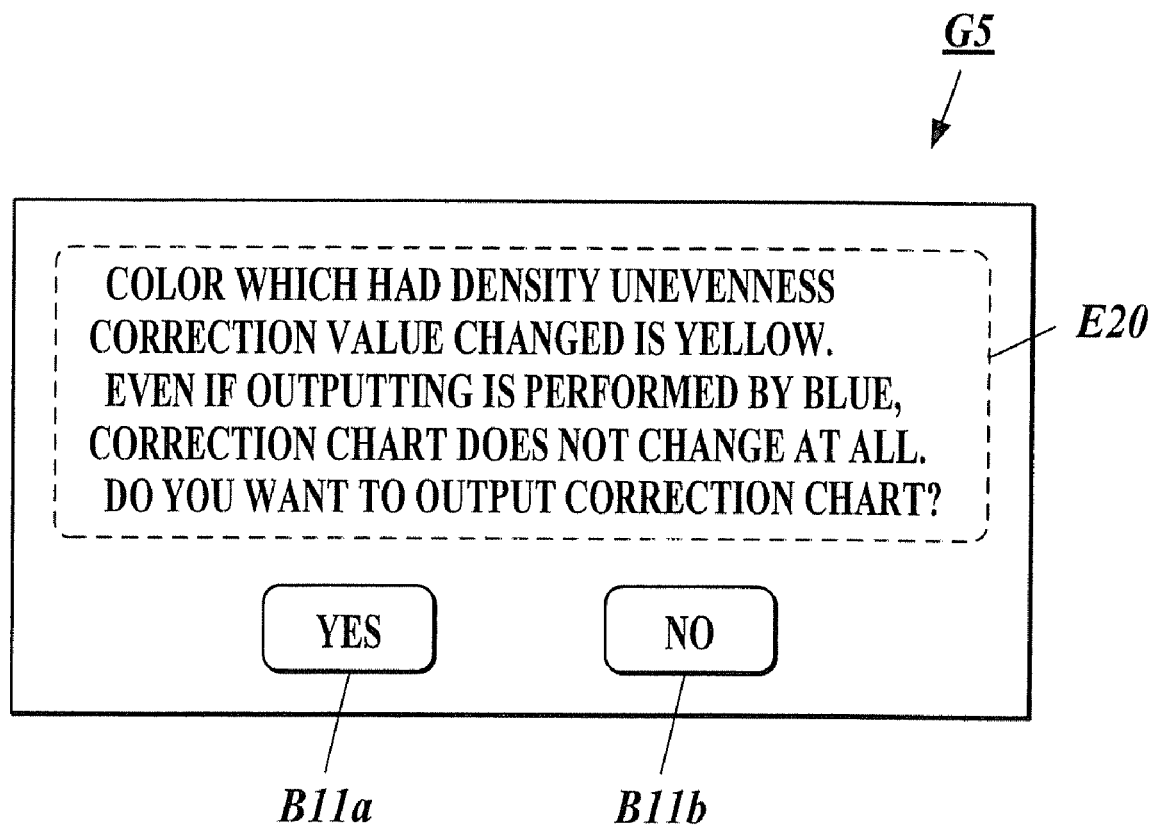

IMAGE FORMING APPARATUS AND DENSITY CORRECTING METHOD

BACKGROUND OF THE INVENTION

1. Field of the Invention

The present invention relates to an image forming apparatus and a density correcting method.

2. Description of Related Art

In general, image forming apparatuses, such as a copying machine and a printer, have a density adjusting function.

In the image forming apparatus, output density is likely to vary due to mechanical factors, such as a variation in the state of the apparatus over time, the mounting position of an optical write device, such as a laser unit, the length of an optical passage, the distortion of a lens, the charged state of a drum, and the state of an intermediate transfer unit, or a change in surrounding environment.

For example, Japanese Patent Application Laid-Open (JP-A) No. 2005-246646 relates to a density adjusting function. JP-A No. 2005-246646 discloses an image forming apparatus.

The image forming apparatus stores image data of a color pattern in which predetermined color (Y, M, and C) patches and color (PCBk) patches obtained by shifting color components of the colors (Y, M, and C) by a predetermined value are arranged such that the tone of the color patch is substantially continuously changed together with identification information corresponding to each of the color patches. Then, the color pattern is output on the basis of the image data of the color patches. When the identification information of the color patch is input to the output color pattern, a color correction table corresponding to the input identification information is used to correct the color of image data to be output.

However, the image forming apparatus disclosed in JP-A No. 2005-246646 uses a color pattern having a, plurality of color patches on a sheet to perform density adjustment. For example, the color pattern needs to be formed in order to adjust only the density of Y (yellow). Therefore, colors other than the color to be subjected to density adjustment are also used to form the color pattern. As a result, toner is unnecessarily used.

In addition, the density adjustment performed by the image forming apparatus disclosed in JP-A-2005-246646 is not density unevenness correction for obtaining uniform density in the main scanning direction. Since density unevenness occurs due to a color (output color) used to form an image or the density of the output color, it is necessary to adjust the density of each output color. For example, when four output colors, that is, Y (yellow), M (magenta), C (cyan), and K (black) are used, it is necessary to adjust the density of each of the colors and mixed colors thereof. When density unevenness adjustment is performed and an image with density including the adjusted output colors is formed and output, paper or toner is unnecessarily used.

SUMMARY OF THE INVENTION

It is, therefore, a main object of the present invention to realize a density unevenness correction function to reduce the unnecessary use of resources.

To achieve at least one of the aforementioned objects or other objects, an image forming apparatus, comprises:

a plurality of color image forming units each forming an image for correction for each different color on a different paper to output a correction chart;

an operation unit for accepting an input of density correction instruction information corresponding to each of the plurality of color image forming units based on the correction chart;

a control unit for setting color of the image for correction according to the density correction instruction information input by the operation unit, generating the image for correction for the set color, and causing the image for correction to be formed on the paper by the color image forming unit in order to output the correction chart; and a density unevenness correction unit for correcting density unevenness of each pixel in a main scanning direction for each of the plurality of color image forming units based on the density correction unevenness information input by the operation unit.

BRIEF DESCRIPTION OF THE DRAWINGS

The above and other objects, advantages and features of the present invention will become more fully understood from the detailed description given below and the appended drawings, and the following descriptions pertain to the embodiment of the present invention are not intended to limit the present invention, and wherein:

FIG. 4 is a diagram illustrating an example of a register map of a correction register;

FIG. 7 is a diagram illustrating an example of a machine state screen;

FIG. 9 is a diagram illustrating an example of a density unevenness correction setting screen;

FIG. 13 is a diagram illustrating an example of a correction chart output confirmation screen.

DESCRIPTION OF THE PREFERRED EMBODIMENTS

<First Embodiment>

Hereinafter, exemplary embodiments of the invention will be described in detail with reference to the accompanying drawings.

First, a structure will be described.

Figure 1:
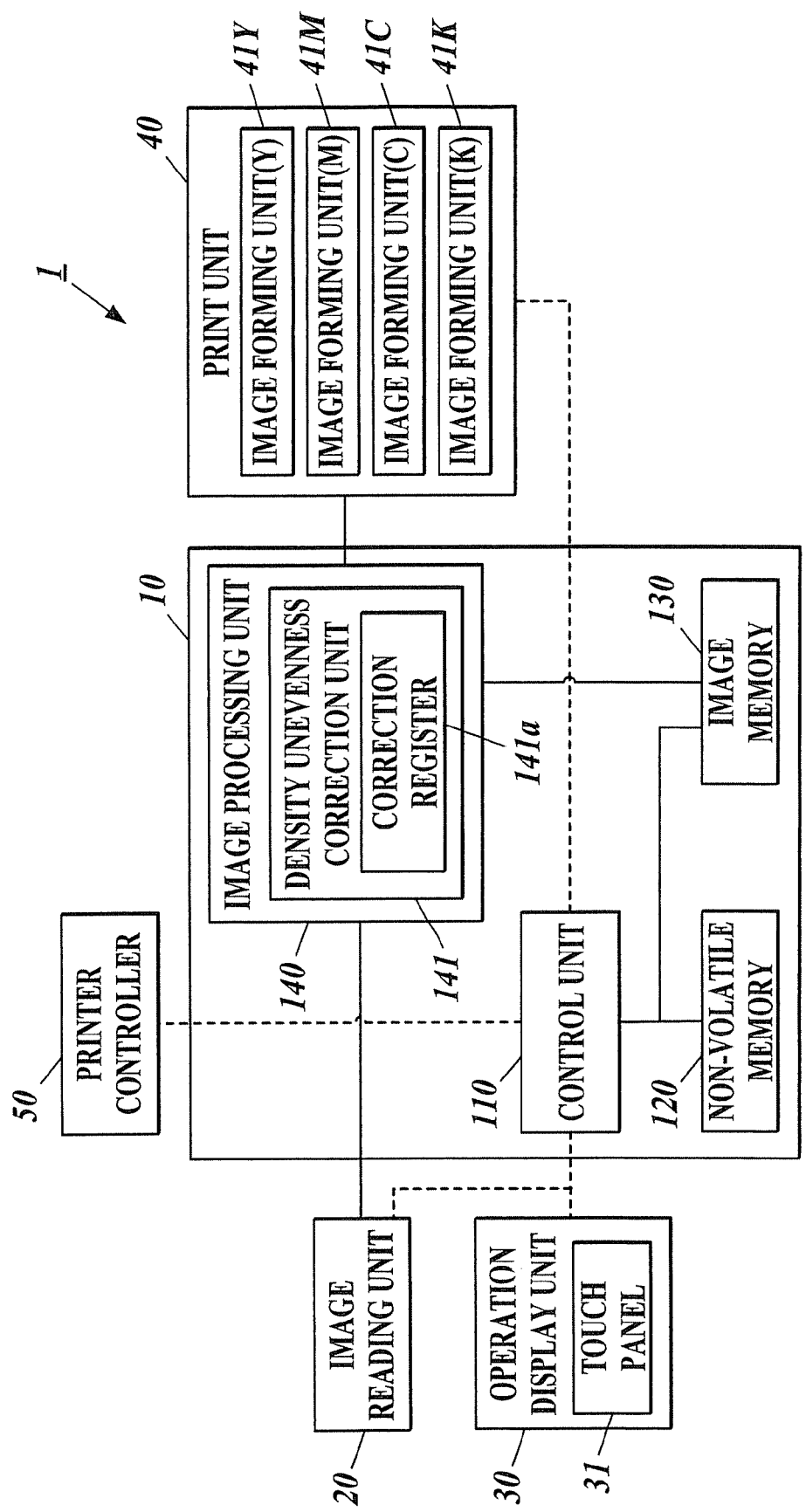
FIG. 1 is a diagram illustrating the functional structure of an image forming apparatus according to a first embodiment of the invention.

FIG. 1 is a diagram illustrating the functional structure of an image forming apparatus 1 according to a first embodiment of the invention.

The image forming apparatus 1 according to this embodiment is an apparatus that reads the image of a document and forms the read image on paper, or an apparatus that receives job information including setting information, such as the image forming conditions of image data, or page data including image data from, for example, an external apparatus and forms an image on paper on the basis of the received job information. In addition, the image forming apparatus 1 may be a digital multi-function machine including, for example, a post-processing unit that performs a post-process on paper having an image formed thereon.

As shown in FIG. 1, the image forming apparatus 1 includes, for example, a main body control unit 10, an image reading unit 20, an operation display unit 30, a print unit 40, and a printer controller 50.

The print unit 40 includes image forming units 41Y, 41M, 41C, and 41K that can be filled with different color toners when a mixed color of a maximum of four colors (yellow (Y), magenta (M), cyan (C), and black (K)) is used to form a color image.

The main body control unit 10 includes, for example, a control unit 110, a nonvolatile memory 120, an image memory 130, and an image processing unit 140, and each unit is controlled by the control unit 110.

The control unit 110 includes, for example, a CPU (central processing unit), a ROM (read only memory), and a RAM (random access memory). The control unit 110 reads a designated program or data from a system program, various application programs, and various data stored in the ROM or the nonvolatile memory 120, develops the read program or data in the RAM, and performs various processes in corporation with the program developed in the RAM to control each unit of the image forming apparatus 1.

For example, the control unit 110 switches an operation mode to a copy mode, a printer mode, or a scanner mode to control a copy operation, a printing operation, or the read of image data in response to an instruction signal input from an external apparatus through the operation display unit 30 or the printer controller 50.

The control unit 110 reads a density unevenness correction program according to this embodiment or various necessary data from the ROM or the nonvolatile memory 120, and controls a density unevenness correction process in cooperation with the program and various data.

The density unevenness correction process is performed as follows.

The operation display unit 30 receives input density correction instruction information, which will be described below, for each of the image forming units 41Y, 41M, 41C, and 41K. Then, the color of an image for correction is set on the basis of the received density correction instruction information, and a density unevenness correction unit 141 corrects the density of each pixel in the image for correction with the set color on the basis of the density correction instruction information, thereby generating an image for correction.

The image forming units 41Y, 41M, 41C, and 41K are driven according to the color of the image for correction to form the image for correction on paper, thereby generating a correction chart. Then, the correction chart is output.

The density correction instruction information includes the color of an image formed by each of the image forming units 41Y, 41M, 41C, and 41K, and the correction value of an auxiliary reference position for each of the image forming units 41Y, 41M, 41C, and 41K, and information indicating whether the correction function of a density unevenness correction unit, which will be described below, for the auxiliary reference position of each of the image forming units 41Y, 41M, 41C, and 41K is invalid or valid.

Figure 2:
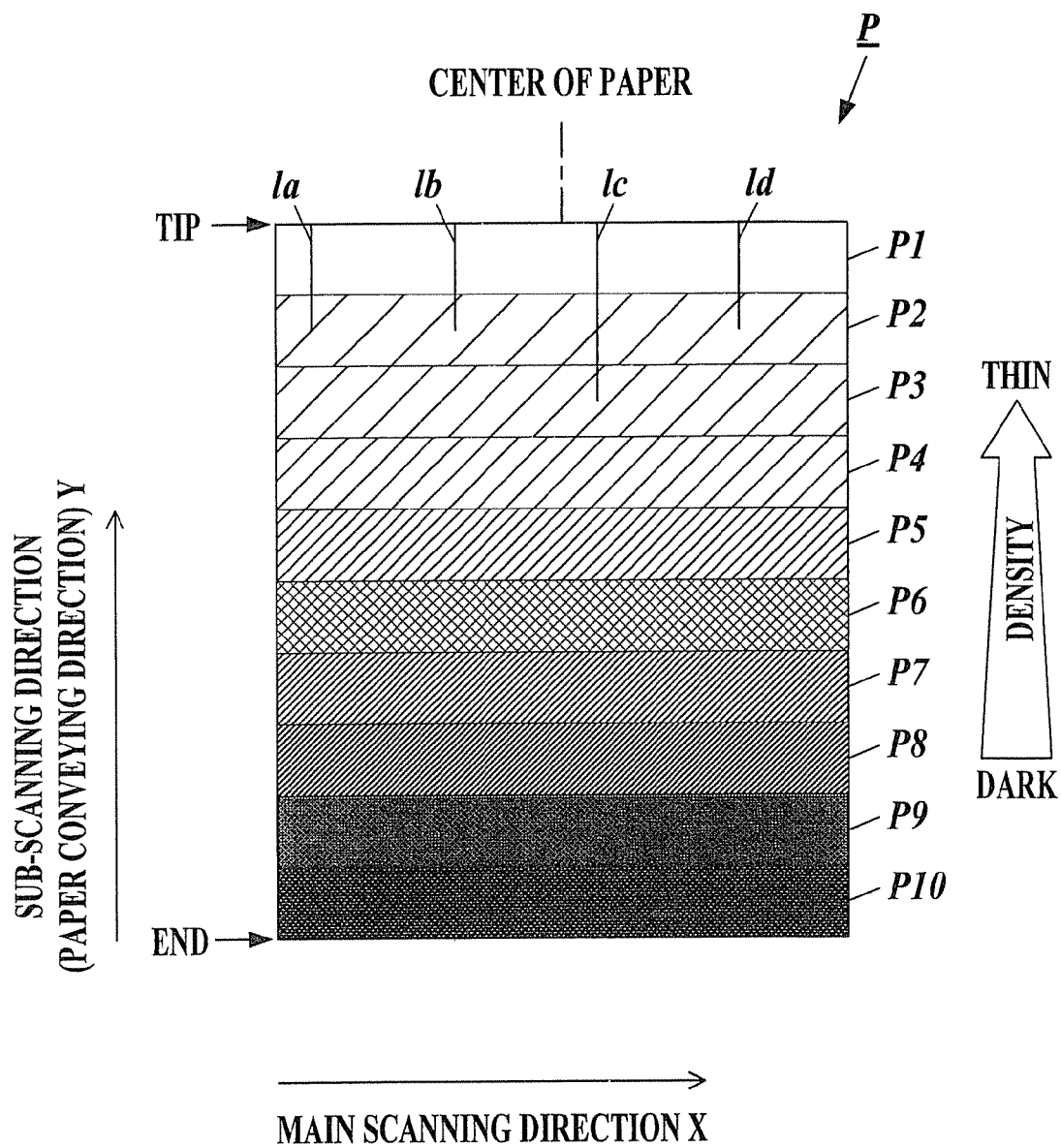
FIG. 2 is a diagram illustrating an example of a correction chart.

FIG. 2 shows an example of a correction chart in which an image for correction is formed on paper.

As shown in FIG. 2, an image P for correction includes a plurality of beltlike images P1 to P10 and a plurality of auxiliary lines 1a to 1d that are formed on the beltlike images P1 to P10.

The beltlike images P1 to P10 have predetermined colors and densities and extend in a main scanning direction X. The beltlike images P1 to P10 that are adjacent to each other in a sub-scanning direction Y have same colors but different densities, and are arranged such that their densities are sequentially decreased or increased from the tip to the end of paper in a paper conveying direction (in the sub-scanning direction Y).

The auxiliary lines 1a to 1d are arranged at correction reference positions that are set at intervals of a predetermined number of pixels in the main scanning direction and extend in the sub-scanning direction on the beltlike images P1 to P10.

In the first embodiment, the image for correction includes the beltlike images and lines (auxiliary lines) extending in the sub-scanning direction, but the invention is not limited thereto. For example, instead of the auxiliary lines, an image for correction including images, such as figures, symbols, or characters, and beltlike images may be used.

Figure 3:
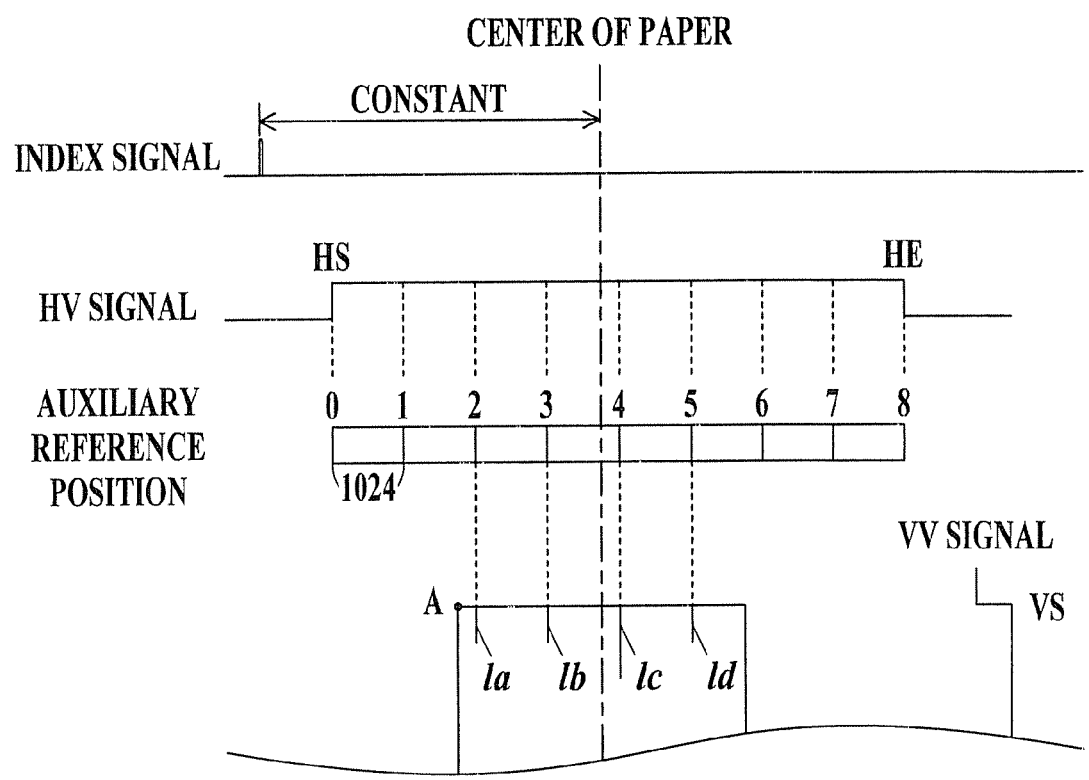
FIG. 3 is a diagram illustrating the relationship between auxiliary lines and correction reference positions.

FIG. 3 is a diagram illustrating the relationship between the auxiliary lines and the correction reference positions.

A main scanning write reference signal (INDEX signal) is a timing signal generated when laser light emitted from an exposure device in the main scanning direction passes through a sensor provided in the vicinity of a scanning start position in the main scanning direction.

A main scanning valid write signal (HV signal; horizontal valid signal) is generated on the basis of the width of a paper size in the main scanning direction. An effective region corresponding to one line in the main scanning direction is from the rising edge (HS) of the HV signal (at a high level) to the falling edge (HE) of the HV signal (at a low level).

A sub-scanning valid write signal (VV signal; vertical valid signal) indicates the entire effective image region of image data.

The correction reference positions are obtained by dividing a length corresponding to the period from HS to the HE of the HV signal by a predetermined number of pixels (for example, 1024 pixels). Therefore, it is rare that one of the correction reference positions is aligned with the central position of the paper. However, the time from the rising edge of the INDEX signal to the output of the pixel signal at the center of the paper is constant, and the time from the rising edge of the INDEX signal to HS of the HV signal is also constant. Therefore, the time from HS of the HV signal to the output of the pixel signal at the center of the paper is also constant. As a result, it is possible to calculate the positions of the auxiliary lines corresponding to the auxiliary reference positions formed on the paper.

For example, when the central position of the paper is 4000 clocks away from the rising edge of the INDEX signal, HS is 100 clocks away from the rising edge of the INDEX signal, HE is 7900 clocks away from the rising edge of the INDEX signal, and a paper size is A4 having a length of 210 mm in the main scanning direction, the write start position A of the paper is calculated at 600 dpi, and an auxiliary reference position closest to the write start position A is calculated as follows.

The number of clocks from the rising edge of the INDEX signal at the write start position A can be calculated by the following expression.

$$\text{Write start position } A = 4000 - (210 \times (600/25.4))/2 = 1520$$

The write start position A is 1520 clocks away from the rising edge of the INDEX signal. That is, the write start position A is 1420 clocks away from HS. Since the auxiliary reference positions are disposed at an interval of 1024 clocks from HS, no auxiliary line is formed at the auxiliary reference positions with identification numbers 0 and 1 within the range that is 1420 clocks away from HS, but an auxiliary line is formed at an auxiliary reference position with identification number 2 and is 2048 clocks (1420 +628 (=1024 ×2−1420)) away from HS. In this way, it is possible to calculate the position of an auxiliary line corresponding to each auxiliary reference position on the paper.

The volatile memory 120 stores a density unevenness correction program according to the first embodiment, data required for the density unevenness correction program, and data processed by various programs, in addition to various process programs and data required to form an image.

The image memory 130 includes, for example, an HDD (hard disk drive) and a DRAM (dynamic RAM), and readably and writably stores image data. The image memory 130 stores image data input from the image reading unit 20 or the printer controller 50, and reads image data stored in the image memory 130 and outputs it to the image processing unit 140 under the control of the control unit 110.

The image processing unit 140 performs various image processing operations on the image data input from the image reading unit 20, the printer controller 50, or the image memory 130 and outputs the processed image data to the control unit 110 or the image memory 130. For example, the image processing unit 140 converts an analog image signal input from the image reading unit 20 into digital image data, it compresses the digital image data and outputs the compressed image data to the image memory 130, or it decompresses the compressed image data and outputs the decompressed image data.

In addition, the image processing unit 140 generates the HV signal, the VV signal, and a clock signal (CLK signal) and outputs the signals to the control unit 110. For example, the CLK signal is generated by a quartz oscillator provided in the image processing unit 140 (a substrate having the image processing unit formed thereon).

The image processing unit 140 further includes the density unevenness correction unit 141.

The density unevenness correction unit 141 includes a correction register 141a that stores the correction values of the image forming units 41Y, 41M, 41C, and 41K set by the control unit 110. The density unevenness correction unit 141 is a correction unit having a correction function of storing the correction value of each of the correction reference positions set by the control unit 110 in the correction register 141a on the basis of the density correction instruction information input by the operation display unit 30, performing linear interpolation between the correction reference positions on the basis of the correction values stored in the correction register 141a, and correcting unevenness in the density of each pixel in the image formed by each of the image forming units 41Y, 41M, 41C, and 41K in the main scanning direction, on the basis of the result of the linear interpolation performed between the each of correction reference positions.

FIG. 4 is a diagram illustrating an example of a register map of the correction register 141a.

As shown in FIG. 4, a register map M includes the address of the correction register 141a, the name of data of the address, and intended use.

Address '00h' serves as a switching unit that switches the correction function of the density unevenness correction unit 141 for the image forming units set by the correction register 141a, to be valid or invalid on the basis of the density correction instruction information. When the address is 0, the correction function is set to be invalid. When the address is 1, the correction function is set to be valid. Instead of the address '00h', a mechanical switch may be provided which blocks signals input to the density unevenness correction unit when the correction function is invalid.

The initial value of a density unevenness process performed by the density unevenness correction unit 141 is stored at address '01h'.

Address '02h' and addresses subsequent thereto indicate the correction values of the correction reference positions set by the control unit 110 on the basis of the density correction instruction information input by the operation display unit 30. In the first embodiment, a, differential amount (correction amount difference) from a correction value set at the previous correction reference position is set as the correction value stored in the correction register 141a. Alternatively, a correction value may be set for each auxiliary reference position.

The image reading unit 20 includes, for example, a CCD, an image read control unit, an automatic document feeder (ADF), and a reading unit. The image read control unit controls, for example, the automatic document feeder and the reading unit on the basis of instructions from the control unit 110, which will be described below, to read the images of a plurality of documents. A read analog image signal is output to the image processing unit 140. In this embodiment, the image is not limited to image data of, for example, a figure or a photograph, but also includes text data, such as characters or symbols.

The image data (analog image signal) read by the image reading unit 20 is output to the image processing unit 140, and the image processing unit 140 converts the analog image data into digital image data, performs various image processing operations on the digital image data, and outputs the processed image data to the print unit 40.

The operation display unit 30 includes, for example, an LCD (liquid crystal display), a touch panel 31 that is provided so as to cover the LCD, an operation display control unit, and operation keys (not shown).

Figure 7:
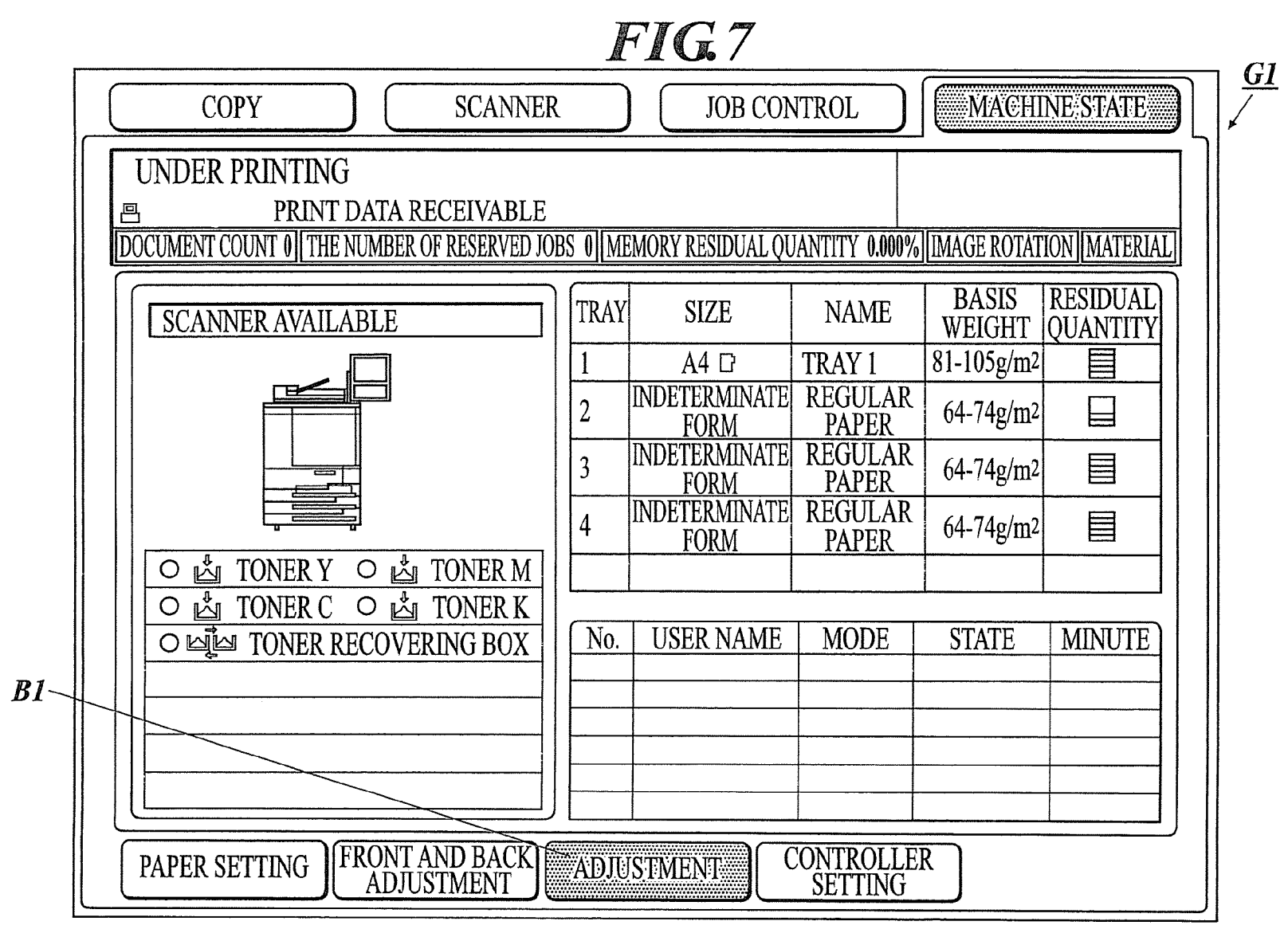
Figure 8:
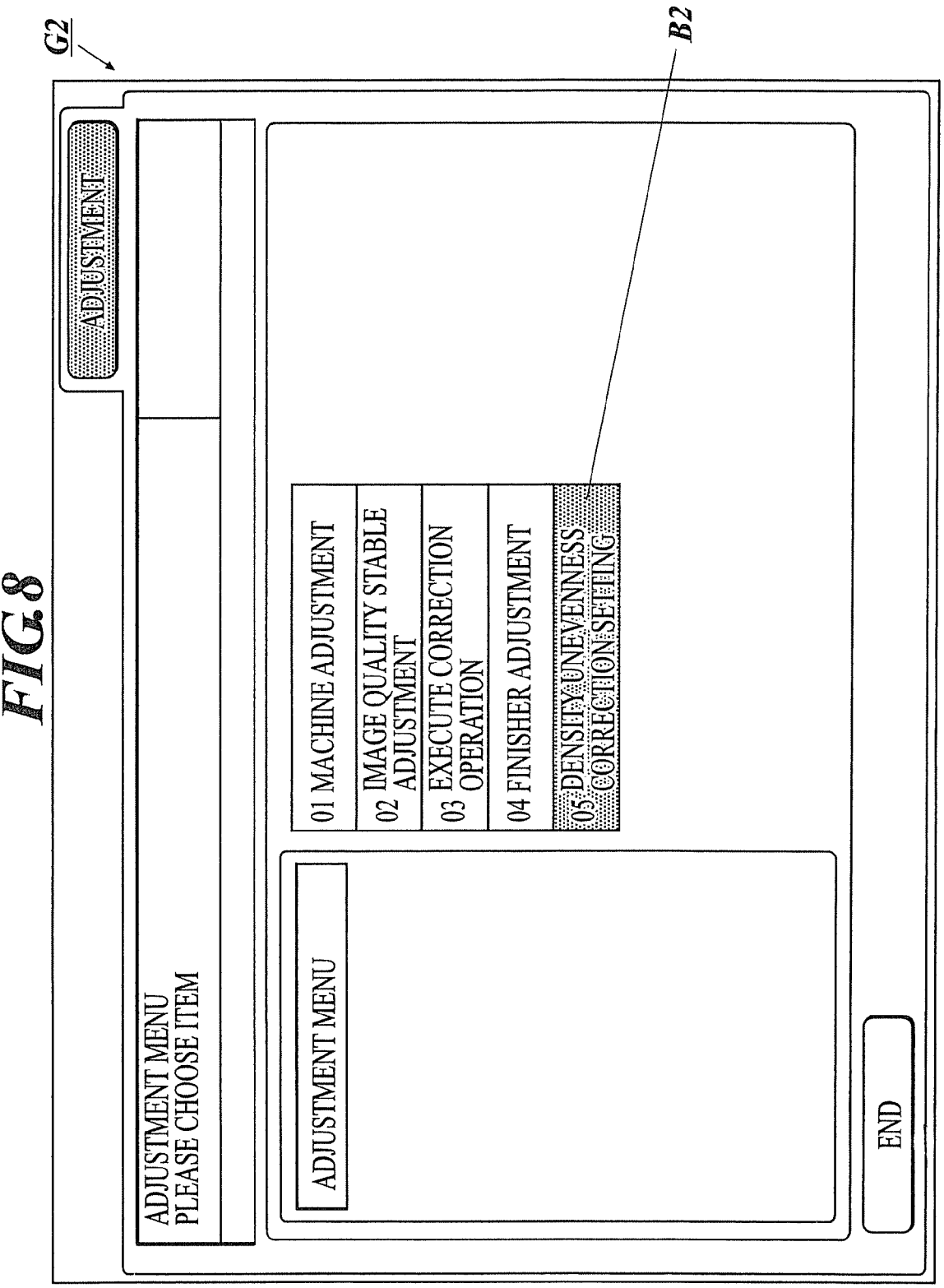
FIG. 8 is a diagram illustrating an example of an adjustment screen.
Figure 9:
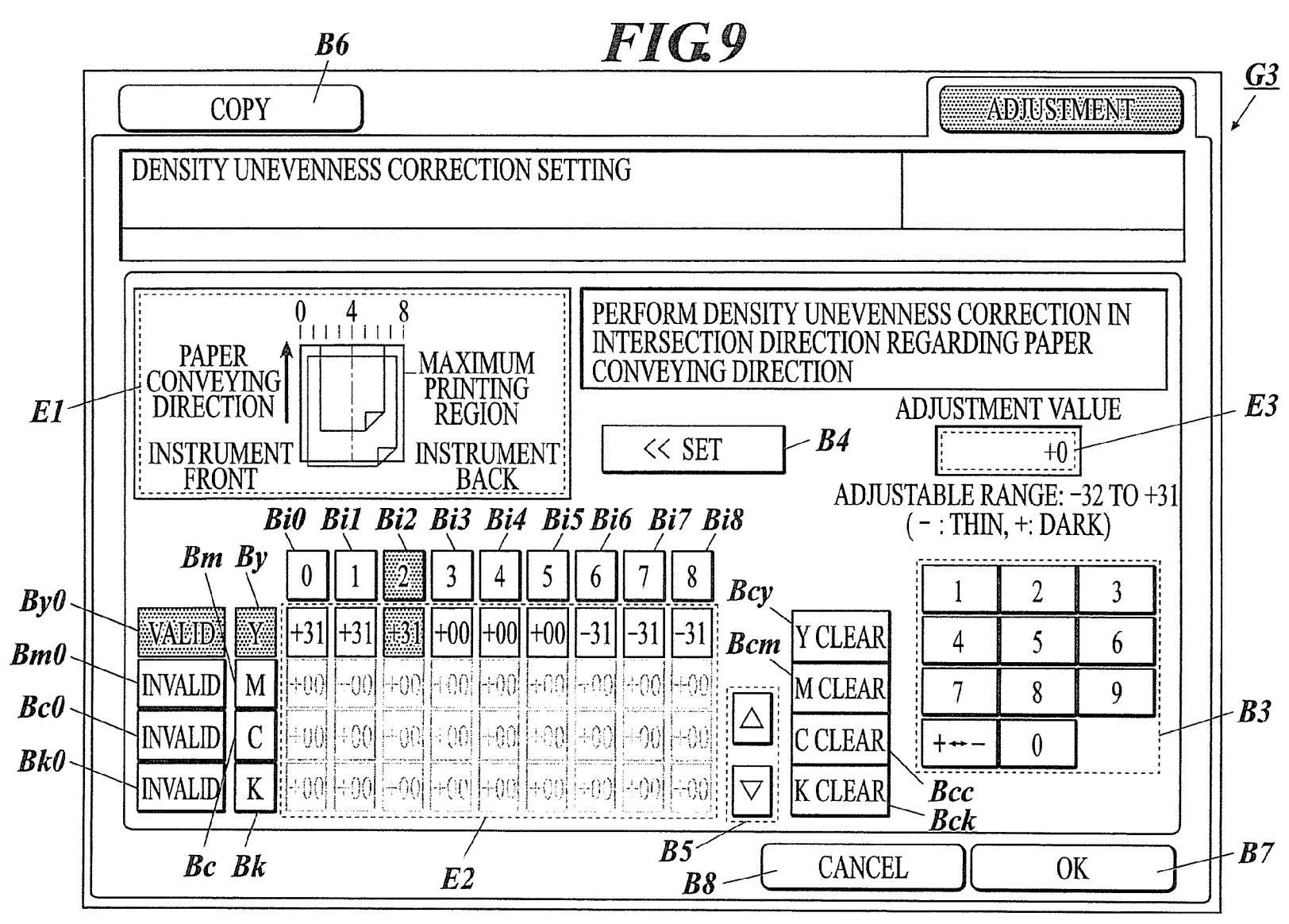

In the operation display unit 30, the operation display control unit displays various setting screens for inputting various setting conditions, for example, various screens shown in FIGS. 7 to 9, or various processed results on the LCD, according to display signals input from the control unit 110. In addition, the operation display unit 30 outputs operation signals input from an operation key group or the touch panel 31 to the control unit 110.

The print unit 40 operates the image forming units 41Y, 41M, 41C, and 41K to perform an electrophotographic image forming process on the basis of input print data, and includes units related to printout, such as a paper feed unit, a paper conveying unit, the image forming units 41Y, 41M, 41C, and 41K, a fixing device, and a discharge unit, and a print control unit.

The paper feed unit includes a plurality of paper feed trays. Various types of paper are accommodated in the paper feed trays, and the paper at an upper side is conveyed one by one to the paper conveying unit.

The paper conveying unit conveys the paper fed from the paper feed tray to the image forming unit 41 through, for example, a plurality of intermediate rollers and a registration roller.

The image forming unit 41Y includes, for example, a photoconductor drum, and a charging device, an exposure device, a developing device, a primary transfer roller, and a cleaning device that are provided in the vicinity of the photoconductor drum, and forms a yellow (Y) image on the paper.

Specifically, the exposure device radiates light corresponding to yellow (Y) image data onto the photoconductor drum charged by the charging device to form an electrostatic latent image. Then, the developing device attaches charged yellow (Y) toner to the surface of the photoconductor drum having the electrostatic latent image formed thereon to develop the electrostatic latent image. Then, the toner attached to the photoconductor drum by the developing device is transferred onto an intermediate transfer belt in a transfer position where the primary transfer roller is arranged, by rotating the photoconductor drum at a constant speed. After the toner is transferred onto the intermediate transfer belt, the cleaning device removes, e.g. charge or toner remaining on the surface of the photoconductor drum. The fixing device thermally fixes the toner image transferred onto paper, and the paper having the toner image thermally fixed thereto is pinched by the discharge rollers and then discharged from an outlet.

Similarly, the image forming units 41Y, 41M, 41C, and 41K each include a charging device, an exposure device, a developing device, a primary transfer roller, and a cleaning device that are provided in the vicinity of the photoconductor drum, and form magenta (M), cyan (C), and black (K) images, respectively.

The image forming units 41Y, 41M, 41C, and 41K serve as units for forming a plurality of color images that are driven in a designated print mode to form different color images for correction on the paper and output a correction chart.

For example, in a print mode (mono-color mode) that forms an image with one color among six colors including yellow (Y), magenta (M), and cyan (C) other than black (K), and red (R), green (G), and blue (B), which are combinations of yellow (Y), magenta (M), and cyan (C) on paper, an image forming unit including a developing device filled with color toner forming a designated color forms an image.

In a print mode (full color mode) that forms an image on paper using mixed colors of a maximum of four colors (yellow (Y), magenta, (M), cyan (C), and black (K)), all the image forming units form images.

In a print mode (monochrome mode) that forms a black (K) image on paper, the image forming unit 41K including a developing device filled with black toner forms an image.

Figure 5:
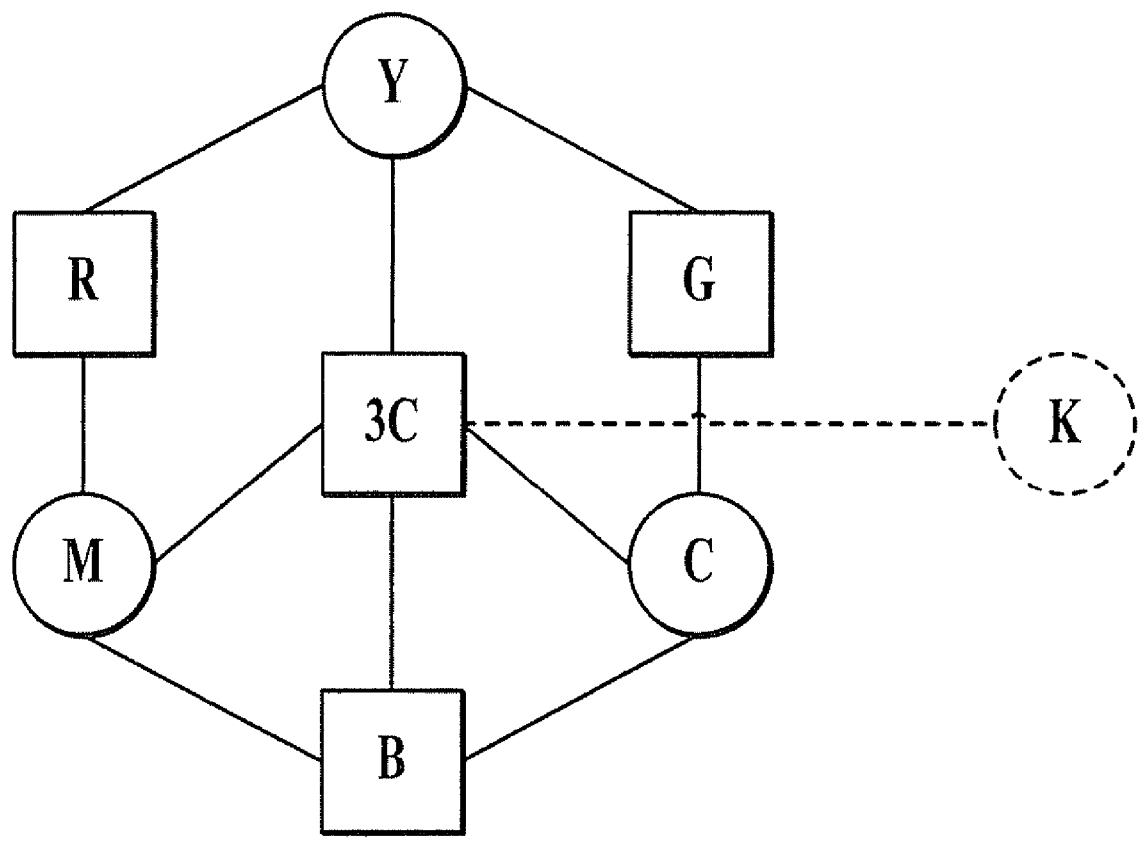
FIG. 5 is a diagram illustrating the relationship between colors (component colors) of images to be formed by image forming units and color to be obtained by combining the component colors.

FIG. 5 is a diagram illustrating the relationship between the component colors (yellow (Y), magenta (M), cyan (C), and black (K)) of the images formed by the image forming units 41Y, 41M, 41C, and 41K; and the colors (red (R), green (G), blue (B), and process black (3C)) obtained by mixing the component colors. The process black (3C) is obtained by mixing three colors, that is, yellow (Y), magenta (M), and cyan (C).

In FIG. 5, the colors corrected by the density unevenness correction unit 141, that is, the component colors (yellow (Y), magenta (M), cyan (C), and black (K)) of the images formed by the image forming units 41Y, 41M, 41C, and 41K are represented by circles, the colors (red (R), green (G), blue (B), and process black (3C)) obtained by mixing the component colors are represented by rectangles, and the related colors are linked by lines.

As shown in FIG. 5, yellow (Y) is a component color for red (R), green (G), and process black (3C). Therefore, when the correction value of the density of the image forming unit 41Y forming a yellow (Y) image is changed, the tones of red (R), green (G), and process black (3C) are changed. Therefore, red (R), green (G), and process black (3C) are related to yellow (Y).

Magenta (M) is a component color for red (R), blue (B), and process black (3C). Therefore, when the correction value of the density of the image forming unit 41M forming a magenta (M) image is changed, the tones of red (R), blue (B), and process black (3C) are changed. Therefore, red (R), blue (B), and process black (3C) are related to magenta (M).

Cyan (C) is a component color for blue (B), green (G), and process black (3C). Therefore, when the correction value of the density of the image forming unit 41C forming a cyan (C) image is changed, the tones of blue (B), green (G), and process black (3C) are changed. Therefore, blue (B), green (G), and process black (3C) are related to cyan (C).

In the image forming apparatus 1 performing UCR (under color removal) that replaces an achromatic color, which is a mixture of yellow (Y), magenta (M), and cyan (C), with black (K), process black (3C) is related to black (K).

The fixing device thermally fixes the toner image transferred onto the paper. The discharge unit pinches the paper having the toner image fixed thereto between the discharge rollers and discharges the paper to the discharge tray.

When the image forming apparatus 1 is used as a network printer, the printer controller 50 outputs data transmitted from an external apparatus, such as a PC (personal computer), connected to, for example, a LAN (local area network) to the image forming apparatus 1.

Next, the operation of the first embodiment will be described.

Figure 6:
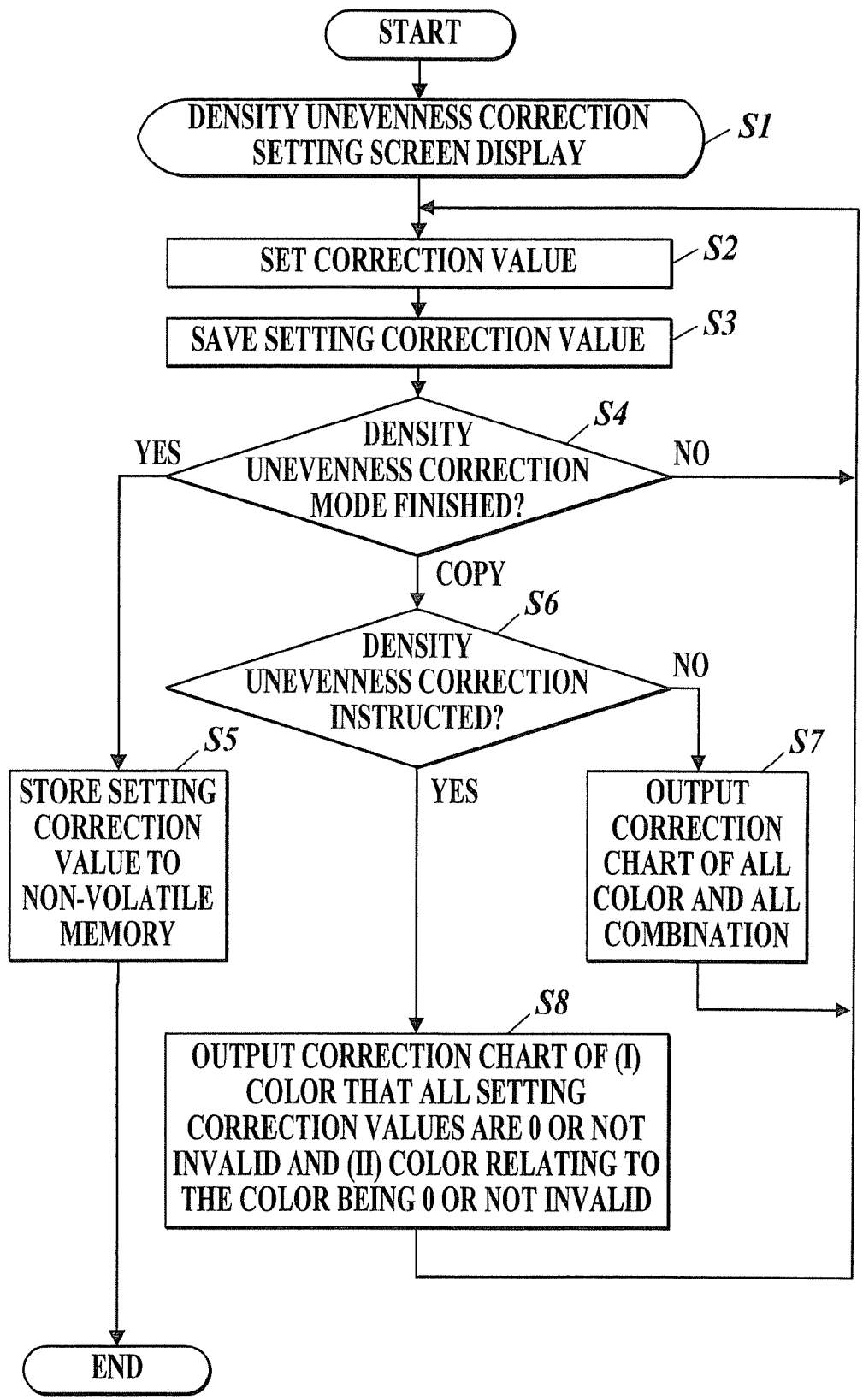
FIG. 6 is a flowchart illustrating a density unevenness correction process according to the first embodiment.

FIG. 6 is a flowchart illustrating the density unevenness correction process according to the first embodiment. The control unit 110 performs the density unevenness correction process in cooperation with other unit.

First, the control unit 110 controls the operation display unit 30 to display a machine state screen indicating the machine state of the image forming apparatus 1 in response to instructions input from the operation display unit 30.

FIG. 7 is a diagram illustrating an example of a machine state screen G1.

As shown in FIG. 7, the state of toner or the state of paper accommodated in each of the paper feed trays is displayed on the machine state screen G1. In addition, an adjustment button B1 for displaying an adjustment screen that allows the user to adjust all the units of the image forming apparatus 1 is provided on the machine state screen G1.

When the adjustment button B1 is pressed, the control unit 110 controls the operation display unit 30 to display the adjustment screen. FIG. 8 is a diagram illustrating an example of an adjustment screen G2.

As shown in FIG. 8, a density unevenness correction setting button B2 for displaying a density unevenness correction setting screen and buttons for displaying the other setting screens are provided on the adjustment screen G2.

When the density unevenness correction setting button B2 is pressed, the control unit 110 controls the operation display unit 30 to display the density unevenness correction setting screen, thereby starting a density unevenness correction mode (Step S1).

FIG. 9 is a diagram illustrating an example of a density unevenness correction setting screen G3.

As shown in FIG. 9, the density unevenness correction setting screen G3 has a paper image region E1, auxiliary reference position buttons Bi0 to Bi8, toner color buttons By, Bm, Bc, and Bk, a numeric keypad B3 including symbols + and −, a display region E3, a set button B4, an increase/decrease button B5, clear buttons Bcy, Bcm, Bcc, and Bck, a correction value display region E2, invalidating buttons By0, Bm0, Bc0, and Bk0, a copy button B6, an OK button B7, and a cancel button B8 provided thereon.

An image indicating the positional relationship between the correction reference position and the correction chart is displayed in the paper image region E1. The auxiliary reference position buttons Bi0 to Bi8 are used to select each correction reference position. The toner color buttons By, Bm, Bc, and Bk are used to select toner colors. The correction value indicated by the numeric keypad B3 is displayed in the display region E3. The set button B4 is used to set the correction value displayed in the display region E3 as a correction value corresponding to the selected toner color button and the selected auxiliary reference position button. The increase/decrease button B5 is used to increase or decrease the correction value corresponding to the selected toner color button and the selected auxiliary reference position button. The clear buttons Bcy, Bcm, Bcc, and Bck are used to initialize the correction value of each toner color. Correction values corresponding to each toner color button and each auxiliary reference position button are displayed in the correction value display region E2. The invalidating buttons By0, Bm0, Bc0, and Bk0 are used to change the correction value set to each toner color button to an invalid correction value (=0) at which the same effect as that when the correction function of the density unevenness correction process is invalid is obtained. The copy button B6 is used to display a copy setting screen.

The control unit 110 receives density correction instruction information input through the density unevenness correction setting screen G3, and sets a correction value corresponding to the density correction instruction information (Step S2). Therefore, the density unevenness correction setting screen G3 displayed on the operation display unit 30 serves as an input unit that inputs density correction instruction information to each of the image forming units on the basis of the correction chart.

For example, in Step S2, the density correction instruction information is input as follows. The user selects one of the toner color buttons By, Bm, Bc, and Bk and one of the auxiliary reference position buttons Bi0 to Bi8, and inputs a correction value corresponding to the toner color and the auxiliary reference position indicated by the two selected buttons using the numeric keypad B3, thereby setting the correction value. Alternatively, when one of the invalidating buttons By0, Bm0, Bc0, and Bk0 is pressed, the correction value of a toner color corresponding to the pressed invalidating button is set to an invalid correction value (=0).

A differential amount (correction amount difference) from the previous correction value of each toner color set by the correction reference position button is used as each correction value set on the density unevenness correction setting screen G3 according to the first embodiment. For example, when 0 is set as a correction value corresponding to the toner color button By and the auxiliary reference position button Bi0, a differential amount from the previous correction amount 0 is set as the correction value corresponding to the toner color button By and the auxiliary reference position button Bi1.

Alternatively, the correction value may be set for each auxiliary reference position.

The control unit 110 stores the correction value set on the density unevenness correction setting screen G3 (hereinafter, a set correction value) in the RAM of the control unit 110 (Step S3).

The control unit 110 determines whether the density unevenness correction mode is finished (Step S4). It is determined in Step S4 that the density unevenness correction mode is finished in the following two cases: when the cancel button B8 is pressed; and when the OK button B7 is pressed. When the OK button B7 is pressed, that is, when the density unevenness correction mode is finished (Step S4; Yes), the control unit 110 stores the set correction value stored in the RAM in the nonvolatile memory 120 (Step S5), and ends the process. When the cancel button B8 is pressed, the control unit 110 ends the process without performing Step S5.

When it is determined that the density unevenness correction mode is not finished and buttons other than the OK button B7 and the cancel button B8 on the density unevenness correction setting screen G3 are pressed (Step S4; No), the control unit 110 performs a process corresponding to the pressed button, and returns to Step S2 to wait for the input of density correction instruction information. When the copy button B6 for outputting the correction chart provided in the operation display unit 30 is pressed (Step S4; copy), the control unit 110 determines whether a density unevenness correction process is instructed on the basis of the density correction instruction information input through the density unevenness correction setting screen G3 (Step S6).

In Step S6, the determination of whether the density unevenness correction process is instructed is performed as follows. When the correction values of all the image forming units are 0 or when the invalidating buttons for all the toner colors are pressed and the address '00h' of the correction register for all the image forming units is set to 0 according to the density correction instruction information input through the density unevenness correction setting screen G3, it is determined that the density unevenness correction process is not instructed.

When the density unevenness correction process is not instructed, that is, when the correction values of all the image forming units are 0, or when the address '00h' of the correction register for all the image forming units is set to 0 and the correction function of the density unevenness correction unit for all the image forming units is invalid (Step S6; No), the control unit 110 sets a total of eight colors including the component colors (Y, M, C, and K) of the images formed by all the image forming units and the colors (R, G, B, and 3C) obtained by mixing the component colors as the colors of images for correction to be formed. In addition, the control unit 110 controls the density unevenness correction unit 141 to correct the density of each pixel in the images for correction with the colors that are set on the basis of the density correction instruction information, thereby generating images for correction. Then, the control unit 110 drives the image forming units 41Y, 41M, 41C, and 41K on the basis of the colors of the images for correction to form the images for correction on paper, thereby outputting a correction chart (Step S7).

When the density unevenness correction process is instructed, that is, when the address '00h' of the correction register is set to 1, there is an image forming unit whose set correction value is neither 1 nor 0, and the density correction instruction information of some of the image forming units is changed (Step S6; Yes), the control unit 110 sets the component colors of the images formed by the image forming units whose density correction instruction information is changed and colors obtained by mixing the component colors as the colors of the images for correction. In addition, the control unit 110 controls the density unevenness correction unit 141 to correct the density of each pixel in the images for correction with the colors that are set on the basis of the density correction instruction information, thereby generating images for correction. Then, the control unit 110 drives the image forming units 41Y, 41M, 41C, and 41K on the basis of the colors of the images for correction to form the images for correction on paper, thereby outputting a correction chart (Step S8).

In the density unevenness correction process according to the first embodiment, colors (R, G, B, and 3C) obtained by mixing the component colors of the images formed by the image forming units may be excluded from the colors of the images for correction, and images for correction with the colors (Y, M, C, and K) of the images formed by all the image forming units may be generated in Step S7. In addition, images for correction with the colors of the images formed by the image forming units whose density correction instruction information is changed may be generated in Step S8.

After Step S7 or Step S8, the control unit 110 returns to Step S2.

As described above, according to the first embodiment, it is possible to output a correction chart in which an image for correction with a color corresponding to the density correction instruction information is formed. Therefore, it is possible to output only a correction chart formed by the image forming unit subjected to a process of correcting the density unevenness of each pixel in the main scanning direction. As a result, it is possible to reduce the unnecessary use of toner or paper and thus achieve a density unevenness correction function capable of reducing the unnecessary use of resources.

In addition, it is possible to generate images for correction with the colors of the images formed by the image forming units whose density correction instruction information is changed and output a correction chart. Therefore, it is possible to output only a correction chart with the color of the image forming unit required to be checked, and thus reduce the unnecessary use of resources. Further, it is possible to generate images for correction with colors obtained by mixing the component colors of the images formed by the image forming units whose density correction instruction information is changed and output a correction chart. Therefore, it is possible to output a correction chart with colors related to the colors of the image forming units whose density unevenness adjustment needs to be checked. As a result, it is possible to improve the precision of checking the correction of density unevenness while reducing the unnecessary use of resources.

When the correction value is 0, or when the address '00h' of the correction register for all the image forming units is 0 and the correction function of the density unevenness correction unit is set to be invalid, that is, when the correction value included in the density correction instruction information is set to an initial value and the density correction instruction information is not changed, it is possible to generate images for correction with the colors of the images formed by the image forming units and output a correction chart. In addition, it is possible to output a correction chart for the image forming unit whose density unevenness adjustment needs to be checked, at the very least, and thus reduce the unnecessary use of resources. Further, it is possible to output a correction chart with colors obtained by mixing the component colors of the images formed by the image forming units. Therefore, it is possible to improve the precision of checking the correction of density unevenness.

<Second Embodiment>

Hereinafter, a second embodiment of the invention will be described in detail with reference to the accompanying drawings.

First, the structure of the second embodiment will be described.

The functional structure of an image forming apparatus 1 according to the second embodiment is the same as that according to the first embodiment, and thus an illustration thereof will be omitted. Only components different from those in the first embodiment will be described.

The control unit 110 reads a density unevenness correction program according to this embodiment or various necessary data from the ROM or the nonvolatile memory 120, and controls a density unevenness correction process in cooperation with the program and various data.

In the density unevenness correction process according to the second embodiment, the following is further performed in the density unevenness correction process according to the first embodiment: the operation display unit 30 receives input color designation information designating the color of an image for correction; and when the color designation information is input, an image for correction with a color indicated by the color designation information is generated.

The following are the same as those in the first embodiment: a correction chart; the relationship between the auxiliary lines and the correction reference positions; a register map of the correction register 141*a* of the density unevenness correction unit 141; and the relationship between the single component colors (yellow (Y), magenta (M), cyan (C), and black (K)) of the images formed by the image forming units 41Y, 41M, 41C, and 41K and colors (red (R) green (G), blue (B), and process black (3C)) obtained by mixing the component colors. Therefore, an illustration and description thereof will be omitted.

Next, the operation of the second embodiment will be described.

Figure 10:
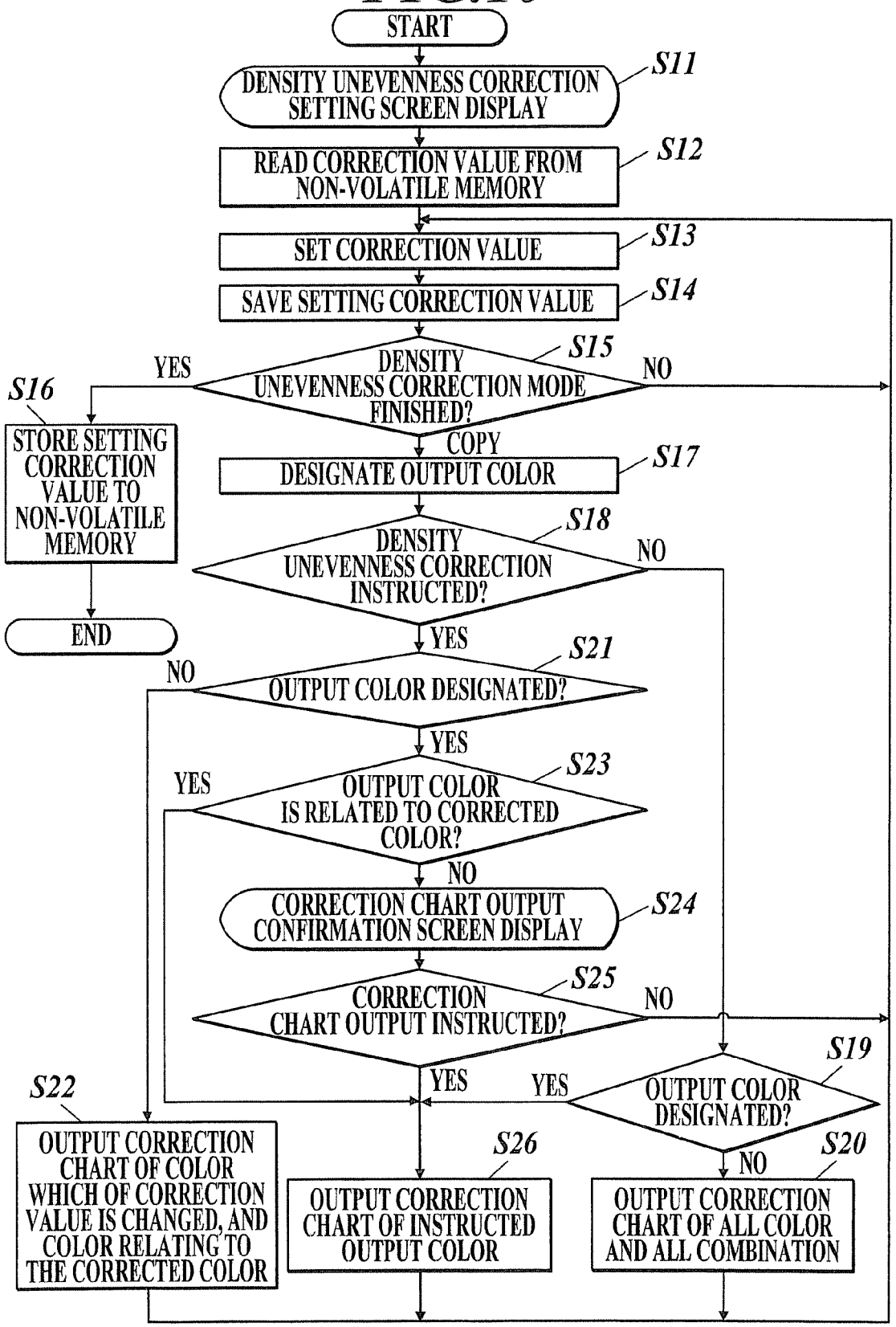
FIG. 10 is a flowchart illustrating a density unevenness correction process according to a second embodiment.

FIG. 10 is a flowchart illustrating the density unevenness correction process according to the second embodiment. The control unit 110 performs the process in cooperation with other unit.

The control unit 110 controls the operation display unit 30 to display a density unevenness correction setting screen, thereby starting a density unevenness correction mode (Step S11). Since Step S11 is the same as Step S1 in the first embodiment, an illustration and description of the machine state screen G1, the adjustment screen G2, and the density unevenness correction setting screen G3 will be omitted.

The control unit 110 displays the density unevenness correction setting screen. In addition, the control unit 110 reads the correction value stored in the nonvolatile memory 120, develops and stores the read correction value as a stored correction value in the RAM of the control unit 110 (Step S12).

The control unit 110 receives density correction instruction information input through the density unevenness correction setting screen G3, and sets a correction value corresponding to the density correction instruction information (Step S13). Then, the control unit 110 stores the correction value set on the density unevenness correction setting screen G3 (hereinafter, referred to as a set correction value) in the RAM of the control unit 110 (Step S14).

Then, the control unit 110 determines whether the density unevenness correction mode is finished (Step S15). When it is determined that the density unevenness correction mode is finished (Step S15; Yes), the control unit 110 stores the set correction value that is displayed in the correction value display region E2 and is stored in the RAM in the nonvolatile memory 120 (Step S16), and ends the process.

Since Steps S13 to S16 are the same as Steps S2 to S5 in the first embodiment, a detailed description thereof will be omitted.

Figure 11:
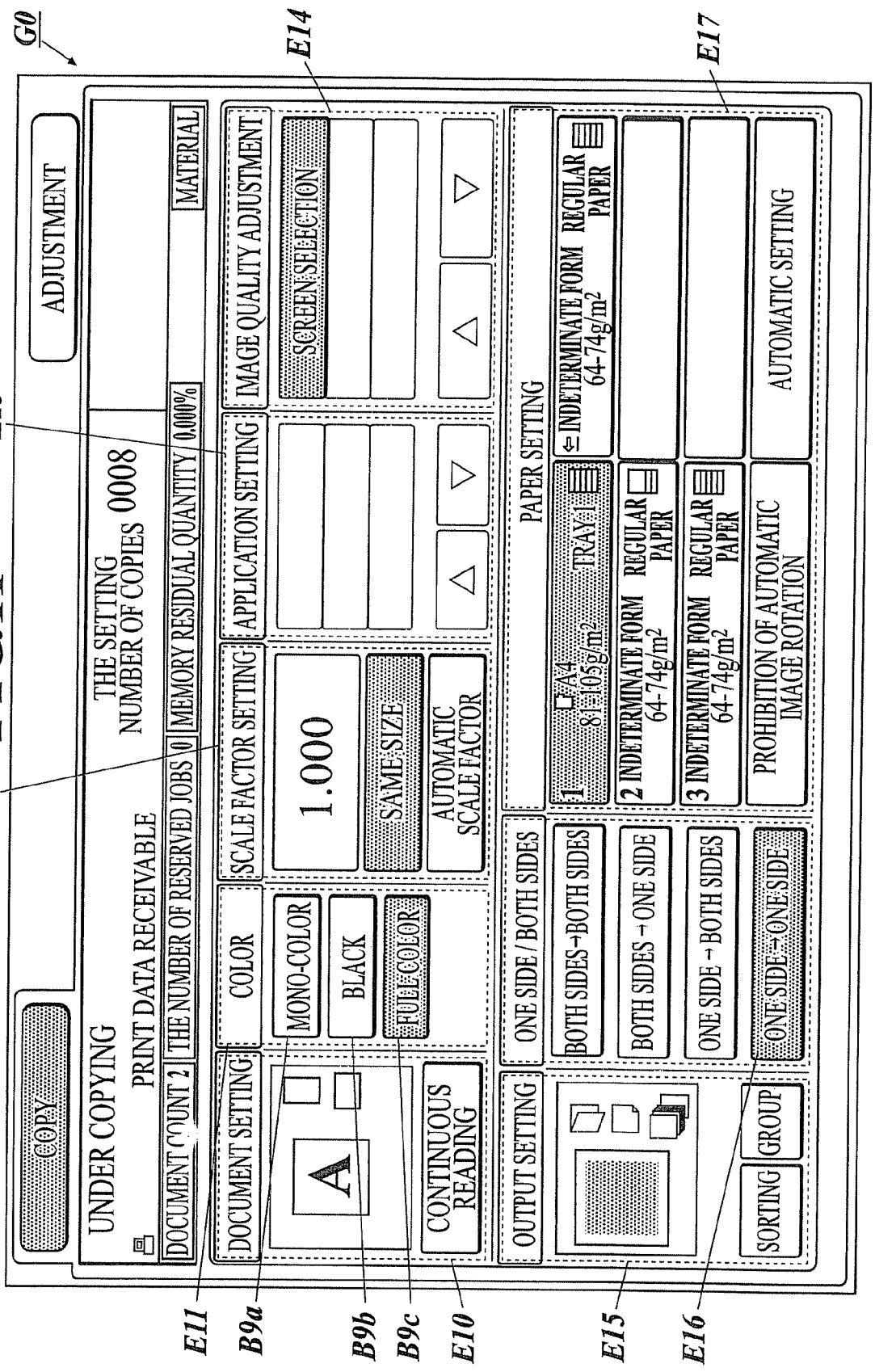
FIG. 11 is a diagram illustrating an example of a copy setting screen.

When it is determined that the density unevenness correction mode is not finished and buttons other than the OK button B7 and the cancel button B8 on the density unevenness correction setting screen G3 are pressed (Step S15; No), the control unit 110 performs a process corresponding to the pressed button, and returns to Step S13 to wait for the input of density correction instruction information. When the copy button B6 of the density unevenness correction setting screen G3 is pressed (Step S15; copy), the control unit 110 displays a copy setting screen. FIG. 11 is a diagram illustrating an example of a copy setting screen G0.

As shown in FIG. 11, the copy setting screen G0 has a document setting region E10, a color setting region E11, a scale factor setting region E12, an application setting region E13, an image quality adjustment region E14, an output setting region E15, a single-side/both-side setting region E16, and a paper setting region E17 provided thereon. The copy setting screen G0 is for setting various output modes of a formed image or for setting various conditions of paper having an image formed thereon. The output mode is an output operation related to an output color (for example, black and colors), a scale factor, a single-sided output or a both-sided output.

The color setting region E11 is provided with a button for inputting color designation information that designates an image forming color (output color), and serves as a color designation portion. The color setting region E11 has a mono-color button B9a for designating a mono-color mode, a black button B9b for designating a black mode, and a full color button B9c for designating a full color mode provided therein.

When the black button B9b is pressed, black (K) is designated as color designation information. When the full color button B9c is pressed, yellow (Y), magenta (M), cyan (C), and black (K) are designated as the color designation information.

When the mono-color button B9a is pressed, a mono-color setting screen is displayed.

Figure 12:
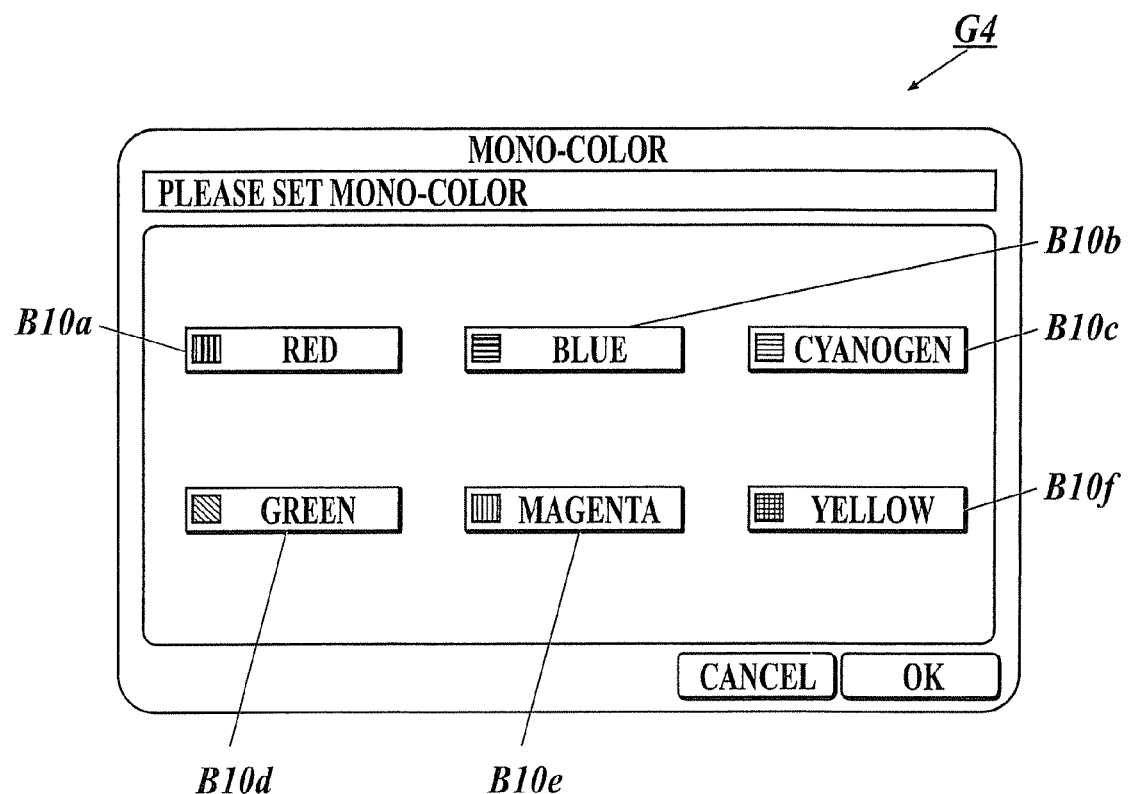
FIG. 12 is a diagram illustrating an example of a monocolor setting screen.

FIG. 12 is a diagram illustrating an example of a mono-color setting screen G4.

The mono-color setting screen G4 shown in FIG. 12 has buttons B10a to B10f for selecting one of six colors, that is, yellow (Y), magenta (M), cyan (C), red (R), green (G), and blue (B) provided thereon. When one of the buttons B10a to B10f is pressed, a color corresponding to the pressed button is designated as the color designation information.

The control unit 110 receives the designation of an output color, that is, color designation information input through the density unevenness correction setting screen G3 (Step S17). Then, when an output button (not shown) for outputting the correction chart provided in the operation display unit 30 is pressed, the control unit 110 determines whether the density unevenness correction process is instructed on the basis of the density correction instruction information input through the density unevenness correction setting screen G3 (Step S18).

As the density correction instruction information input through the density unevenness correction setting screen G3, the correction value stored from the nonvolatile memory 120 into the RAM in Step S12 and the set correction value stored in the RAM in Step S14 are used to determine whether the density unevenness correction process is instructed in Step S18. The stored correction value and the set correction value for each image forming unit are compared with each other to determine whether the stored correction value and the set correction value for each image forming unit are identical to each other.

When it is determined that the density unevenness correction process is not instructed, that is, when the stored correction value and the set correction value for each of the image forming units are identical to each other and the density correction instruction information of all the image forming units is not changed (Step S18; No), the control unit 110 determines whether an output color is designated (Step S19).

When it is determined that the output color is not designated, that is, when predetermined color designation information is identical to an output color, which is the color designation information designated in Step S17 (Step S19; No), the process of the control unit 110 proceeds to Step S20.

When it is determined that the output color is designated, that is, when the predetermined color designation information is not identical to an output color, which is the color designation information designated in Step S17 (Step S19; Yes), the process of the control unit 110 proceeds to Step S26.

For example, the output color is not designated, that is, the predetermined color designation information is identical to the color designation information, which is the output color designated in Step S17, when the full color mode is set as the predetermined color designation information and the full color mode is selected also in Step S17.

For example, the output color is designated, that is, the predetermined color designation information is not identical to the color designation information, which is the output color designated in Step S17, when the full color mode is set as the predetermined color designation information and the black mode is selected in Step S17.

When it is determined that the output color is not designated (Step S19; No), the control unit 110 sets a total of eight colors including the component colors (Y, M, C, and K) of the images formed by all the image forming units and colors (R, G, B, and 3C) obtained by mixing the component colors as the colors of the images for correction. In addition, the control unit 110 controls the density unevenness correction unit 141 to correct the density of each pixel in the images for correction with the colors that are set on the basis of the density correction instruction information, thereby generating images for correction. Then, the control unit 110 drives the image forming units 41Y, 41M, 41C, and 41K on the basis of the colors of the images for correction to form the images for correction on paper, thereby outputting a correction chart (Step S20).

When the density unevenness correction process is instructed, that is, when the stored correction value and the set correction value for each of the image forming units are not identical to each other and the density correction instruction information of any of the image forming units is changed (Step S18; Yes), the control unit 110 determines whether an output color is designated (Step S21).

When it is determined that the output color is not designated, that is, when predetermined color designation information is identical to the color designation information designated in Step S17 (Step S21; No), the process of the control unit 110 proceeds to Step S22. Since the determination of whether the output color is designated is the same as that in Step S19, a description thereof is omitted.

When it is determined that the output color is not designated (Step S21; No), the control unit 110 sets the colors of the images of the image forming units whose density correction instruction information is changed and colors related to the colors as the colors of the images for correction. In addition, the control unit 110 controls the density unevenness correction unit 141 to correct the density of each pixel in the images for correction with the colors that are set on the basis of the density correction instruction information, thereby generating images for correction. Then, the control unit 110 drives the image forming units 41Y, 41M, 41C, and 41K on the basis of the colors of the images for correction to form the images for correction on paper, thereby outputting a correction chart (Step S22).

When the output color is designated, that is, when predetermined color designation information is not identical to the color designation information designated in Step S17 (Step S21; Yes), the control unit 110 determines whether an output color is related to a color to be subjected to the density unevenness correction process, that is, the color of the image formed by the image forming unit in which the stored correction value is not identical to the set correction value (Step S23).

When the output color is not related to the color of the image formed by the image forming unit that is instructed to perform the density unevenness correction process (Step S23; No), the control unit 110 controls the operation display unit 30 to display a correction chart output confirmation screen (Step S24).

FIG. 13 is a diagram illustrating an example of the correction chart output confirmation screen.

As shown in FIG. 13, a correction chart output confirmation screen G5 has a message region E20, a Yes button B11a, and a No button B11b provided thereon.

A message asking the user to output a correction chart, such as a message 'A color having the density unevenness correction value changed is yellow. Even if blue is output, the correction chart does not change at all. Do you want to output the correction chart?', is displayed in the message region E20 to give the user a notice. Therefore, the correction chart output confirmation screen G5 serves as a notifying portion.

After Step S24, the control unit 110 determines whether an instruction to output the correction chart is issued (Step S25). When the instruction to output the correction chart is not issued, e.g. when the No button B11b is pressed (Step S25; No), the control unit 110 returns to Step S13.

When the instruction to output the correction chart is issued, e.g. when the Yes button B11a is pressed (Step S25; Yes), the process of the control unit 110 proceeds to Step S26.

After the output color is designated (Step S19; Yes), after Step S23, or after the instruction to output the correction chart is issued (Step S25; Yes), the control unit 110 sets the designated output color as the color of a formed image for correction, and forms an image for correction. Then, the control unit 110 drives the image forming units 41Y, 41M, 41C, and 41K on the basis of the colors of the images for correction to form the images for correction on paper, thereby outputting a correction chart (Step S26).

After Step S20, Step S22, or Step S26, the control unit 110 returns to Step S13.

In the density unevenness correction process according to the second embodiment, images for correction with the colors (Y, M, C, and K) of the images formed by the image forming units may be generated in Step S20, and images for correction with the colors of the images formed by the image forming units whose density correction instruction information is changed may be generated in Step S22.

As described above, according to the second embodiment, it is possible to output a correction chart in which an image for correction with a color corresponding to density correction instruction information is formed. Therefore, it is possible to output only a correction chart formed by the image forming unit subjected to a process of correcting the density unevenness of each pixel in the main scanning direction, and thus reduce the unnecessary use of toner or paper. As a result, it is possible to achieve a density unevenness correction function capable of reducing the unnecessary use of resources.

In addition, an image for correction with a color corresponding to color designation information is generated, and a correction chart is output. Therefore, it is possible to output a correction chart with a designated color, and thus reduce the unnecessary use of resources.

Further, colors corresponding to color designation information are compared with the component colors of the images formed by the image forming units whose density correction instruction information is changed and colors obtained by mixing the component colors, and it is possible to notify a message asking the user to output the correction chart on the basis of the comparison results. It is possible to prompt the user to output only the correction chart whose correction unevenness needs to be checked. Therefore, for example, when a color corresponding to color designation information is not identical to the color related to a change in density correction instruction information, it is possible to prevent the output of a correction chart that is not related to the correction of density unevenness. As a result, it is possible to reduce the unnecessary use of resources.

When the density correction instruction information of the entire image forming units is not changed and no color designation information is input, it is possible to output a correction chart with the component colors of the images formed by the entire image forming units and colors obtained by mixing the component colors. Therefore, it is possible to improve the precision of checking the correction of density unevenness.

When the density correction instruction information of any of the image forming units is changed and no color designation information is input, it is possible to generate images for correction with the component colors of the images formed by the image forming units whose density correction instruction information is changed and colors obtained by mixing the component colors, and output a correction chart with the colors. In addition, it is possible to output a correction chart with the colors of the image forming units whose density unevenness adjustment needs to be checked and colors related to the color. Therefore, it is possible to improve the precision of checking the correction of density unevenness while reducing the unnecessary use of resources.

In the above description, the ROM or the nonvolatile memory is used as a computer readable medium having the program according to the invention stored therein, but the invention is not limited thereto.

For example, a nonvolatile memory, such as a flash memory, and a portable recording medium, such as a CD-ROM, may be used as the computer readable medium.

In addition, a carrier wave may be used as a medium that provides program data according to the invention through a communication line.

The invention is not limited to the above-described embodiment, but various modifications and changes of the invention can be made without departing from the scope and spirit of the invention.

In accordance with a first aspect of the present invention, an image forming apparatus, comprises:

a plurality of color image forming units each forming an image for correction for each different color on a different paper to output a correction chart;

an operation unit for accepting an input of density correction instruction information corresponding to each of the plurality of color image forming units based on the correction chart;

a control unit for setting color of the image for correction according to the density correction instruction information input by the operation unit, generating the image for correction for the set color, and causing the image for correction to be formed on the paper by the color image forming unit in order to output the correction chart; and a density unevenness correction unit for correcting density unevenness of each pixel in a main scanning direction for each of the plurality of color image forming units based on the density correction unevenness information input by the operation unit.

Also, in accordance with a second aspect of the present invention, a density correcting method for correcting density unevenness in a main scanning direction based on a correction value in an image forming apparatus including a plurality of color image forming units, comprising:

accepting an input of density correction instruction information for at least one of the plurality of image forming units;

storing the correction value included in the input density correction instruction information; and determining color of one or more images for correction according to the input density correction instruction information, generating the image for correction for the determined color, and outputting a correction chart by forming the image for correction for each color on a different paper.

Preferably, in accordance with a third aspect of the present invention, the control unit generates the image for correction for color of an image to be formed by the image forming unit the density correction instruction information of which has been changed when any of the density correction instruction information of the plurality of color image forming units is changed.

Further, it is possible to output a correction chart by generating image for correction for color of an image to be formed by the image forming unit the density correction instruction information of which has been changed. That is, it is possible to output only a correction chart of color of the image forming unit which is necessary to confirm the color, and reduce the unnecessary use of resources.

Preferably, in accordance with a fourth aspect of the present invention, the control unit generates the image for correction for color to be obtained by using, as component color, the color of the image to be formed by the image forming unit the density correction instruction information of which has been changed when any of the density correction instruction information of the plurality of color image forming units is changed.

Further, it is possible to output a correction chart by generating image for correction for color obtained by using, as component color, color of an image to be formed by the image forming unit the density correction instruction information of which has been changed. That is, it is possible to output a correction chart of each color of the image forming unit which is necessary to adjust density unevenness, and reduce the unnecessary use of resources and improve confirmation precision for correction of density unevenness.

In accordance with a fifth aspect of the present invention, the density correction instruction information includes a correction value for each of the plurality of color image forming units, and the control unit generates all images for correction for colors of images to be formed by the plurality of color image forming units respectively when all the correction values are zero.

Further, it is possible to output a correction chart by generating all images for correction for colors of images to be formed by the plurality of color image forming units respectively when all the correction values are zero, that is, when a correction value included by the density correction instruction information is set to an initial value and the density correction instruction information is not changed. That is, it is possible to output a correction chart of color of the image forming unit which is necessary to confirm at least adjustment of density unevenness, and reduce the unnecessary use of resources.

In accordance with a sixth aspect of the present invention, the control unit generates the image for correction for color obtained by using as component colors, the colors of the images to be formed by the plurality of color image forming units when all the correction values are zero.

Further, it is possible to output a correction chart by generating an image for correction for color obtained by using, as component colors, colors of images to be formed by the plurality of color image forming units respectively when all the correction values are zero, that is, when a correction value included by the density correction instruction information is set to an initial value and the density correction instruction information is not changed. That is, it is possible to improve confirmation precision for correction of density unevenness.

Preferably, in accordance with a seventh aspect of the present invention, the image forming apparatus further comprises:

a switching unit for switching invalid or valid of a correction function of the density unevenness correction unit for each of the plurality of color image forming units according to instruction information indicating invalid or valid of the correction function of the density unevenness correction unit for each of the plurality of color image forming units, wherein the density correction instruction information includes the instruction information indicating invalid or valid of the correction function of the density unevenness correction unit for each of the plurality of color image forming units, and the control unit generates all images for correction for colors of the images to be formed by the plurality of color image forming units when the correction function of the density unevenness correction unit is set invalid by the switching unit for all of the plurality of color image forming units.

Further, it is possible to output a correction chart by generating all images for correction for colors of images to be formed by the plurality of color image forming units respectively when the correction function of the density unevenness correction unit is set invalid by the switching unit for all of the plurality of color image forming units, that is, when a correction value included by the density correction instruction information is set to an initial value and the density correction instruction information is not changed. That is, it is possible to output a correction chart of color of the image forming unit which is necessary to confirm at least adjustment of density unevenness, and reduce the unnecessary use of resources.

Preferably, in accordance with eighth aspect of the present invention, the control unit generates the image for correction for color obtained by using, as component colors, the colors of the images to be formed by the plurality of color image forming units when the correction function of the density unevenness correction unit is set invalid by the switching unit for all of the plurality of color image forming units.

Further, it is possible to output a correction chart by generating an image for correction for color obtained by using, as component colors, colors of images to be formed by the plurality of color image forming units respectively when the correction function of the density unevenness correction unit is set invalid by the switching unit for all of the plurality of color image forming units, that is, when a correction value included by the density correction instruction information is set to an initial value and the density correction instruction information is not changed. That is, it is possible to improve confirmation precision for correction of density unevenness.

Preferably, in accordance with a ninth aspect of the present invention, the image forming apparatus, further comprises:

a color designation unit for inputting color designation information for designating color of the image for correction, wherein the control unit generates the image for correction for color indicated by the color designation information inputted by the color designation unit when the color designation information is inputted by the color designation unit.

Further, since a correction chart is outputted by generating the image for correction for color indicated by the color designation information inputted by the color designation unit, it is possible to output a correction chart of only color designated by the color designation unit, and reduce the unnecessary use of resources.

Preferably, in accordance with a tenth aspect of the present invention, the image forming apparatus, further comprises:
an informing unit, wherein
the control unit generates a message inquiring whether the correction chart is outputted or not, and causing the informing unit to inform the message according to a comparison result obtained by comparing the color indicated by the color designation information inputted by the color designation unit with the color of the image to be formed by the color image forming unit the density correction instruction information of which has been changed when any of the density correction instruction information of the plurality of color image forming units is changed and the color designation information is inputted by the color designation unit.

Further, it is possible to causing the informing unit to inform a message inquiring whether the correction chart is outputted or not according to a comparison result obtained by comparing the color indicated by the color designation information with the color of the image to be formed by the color image forming unit the density correction instruction information of which has been changed. That is, it is possible to urge outputting only a correction chart necessary to confirm correction unevenness and it is possible to reduce the unnecessary use of resources.

Preferably, in accordance with an eleventh aspect of the present invention, the control unit generates the image for correction for component color of the image to be formed by each of the plurality of image forming units and color to obtained by using the component colors when all of the density correction instruction information of the plurality of color image forming units are not changed and the color designation information is not inputted by the color designation unit.

Further, since it is possible to output a correction chart for component color of the image to be formed by each of the plurality of image forming units and color to obtained by using the component colors when all of the density correction instruction information of the plurality of color image forming units are not changed and the color designation information is not inputted by the color designation unit, it is possible to improve confirmation precision for correction of density unevenness.

Preferably, in accordance with a twelfth aspect of the present invention, the control unit generates the image for correction for component color of an image to be formed by the image forming unit whose density correction instruction information has changed and color to be obtained by using component colors when any of the density correction instruction information of the plurality of color image forming units is changed and the color designation information is not inputted by the color designation unit.

Further, it is possible to output a correction chart by generating an image for correction for color of an image to be formed by the image forming unit the density correction instruction information of which has been changed and color to be obtained by using, as component color, the color of the image to be formed. That is, it is possible to output a correction chart of color of the image forming unit which is necessary to confirm at least adjustment of density unevenness and color relating to the color of the image forming unit which is necessary to confirm at least adjustment of density unevenness, and reduce the unnecessary use of resources.

The entire disclosure of Japanese Patent Applications No. 2008-139212 filed on May 28, 2008 including specificats, claims, drawings and summaries are incorporated herein by reference in their entirety.

What is claimed is:

1. An image forming apparatus, comprising:
a plurality of color image forming units each forming an image for correction for each different color on a different paper to output a correction chart;
an operation unit for accepting an input of density correction instruction information corresponding to each of the plurality of color image forming units based on the correction chart, wherein the density correction instruction information includes a correction value for each of the plurality of color image forming units;
a control unit for setting color of the image for correction according to the density correction instruction information input by the operation unit, generating the image for correction for the set color, and causing the image for correction to be formed on the paper by the color image forming unit in order to output the correction chart, and the control unit generates all images for correction for colors of images to be formed by the plurality of color image forming units respectively when all the correction values are zero; and
a density unevenness correction unit for correcting density unevenness of each pixel in a main scanning direction for each of the plurality of color image forming units based on the density correction unevenness information input by the operation unit.

2. The image forming apparatus according to claim 1, wherein the control unit generates the image for correction for color of an image to be formed by the color image forming unit whose density correction instruction information has been changed when any of the density correction instruction information of the plurality of color image forming units is changed.

3. The image forming apparatus according to claim 2, wherein the control unit generates the image for correction for color to be obtained by using, as component color, the color of the image to be formed by the color image forming unit whose density correction instruction information has been changed when any of the density correction instruction information of the plurality of color image forming units is changed.

4. The image forming apparatus according to claim 1, wherein the control unit generates an image for correction for color obtained by using as component colors, the colors of the images to be formed by the plurality of color image forming units when all the correction values are zero.

5. The image forming apparatus according to claim 1, further comprising
a switching unit for switching invalid or valid of a correction function of the density unevenness correction unit for each of the plurality of color image forming units according to instruction information indicating invalid or valid of the correction function of the density unevenness correction unit for each of the plurality of color image forming units, wherein
the density correction instruction information includes the instruction information indicating invalid or valid of the correction function of the density unevenness correction unit for each of the plurality of color image forming units, and
the control unit generates all images for correction for colors of the images to be formed by the plurality of color image forming units when the correction function of the density unevenness correction unit is set invalid by the switching unit for all of the plurality of color image forming units.

6. The image forming apparatus according to claim 5, wherein the control unit generates the image for correction for color obtained by using, as component colors, the colors of the images to be formed by the plurality of color image forming units when the correction function of the density unevenness correction unit is set invalid by the switching unit for all of the plurality of color image forming units.

7. The image forming apparatus according to claim 1, further comprising
a color designation unit for inputting color designation information for designating color of the image for correction, wherein
the control unit generates the image for correction for color indicated by the color designation information inputted by the color designation unit when the color designation information is inputted by the color designation unit.

8. The image forming apparatus according to claim 7, further comprising
an informing unit, wherein
the control unit generates a message inquiring whether the correction chart is outputted or not, and causing the informing unit to inform the message according to a comparison result obtained by comparing the color indicated by the color designation information inputted by the color designation unit with the color of the image to be formed by the color image forming unit the density correction instruction information of which has been changed when any of the density correction instruction information of the plurality of color image forming units is changed and the color designation information is inputted by the color designation unit.

9. The image forming apparatus according to claim 7, wherein the control unit generates all images for correction for colors of images to be formed by the plurality of color image forming units respectively and generates an image for correction for color obtained by using, as component colors, the colors of the images to be formed by the plurality of color image forming units when none of the density correction instruction information of the plurality of color image forming units are changed and when the color designation information is not inputted by the color designation unit.

10. The image forming apparatus according to claim 7, wherein the control unit generates the image for correction for color of an image to be formed by the color image forming unit whose density correction instruction information has been changed and generates the image for correction for color obtained by using, as component color, the color of the image to be formed by the color image forming unit whose density correction instruction information has been changed when any of the density correction instruction information of the plurality of color image forming units is changed and when the color designation information is not inputted by the color designation unit.

11. An image forming apparatus, comprising:
a plurality of color image forming units each forming an image for correction for each different color on a different paper to output a correction chart;
an operation unit for accepting an input of density correction instruction information corresponding to each of the plurality of color image forming units based on the correction chart;
a control unit for setting color of the image for correction according to the density correction instruction information input by the operation unit, generating the image for correction for the set color, and causing the image for correction to be formed on the paper by the color image forming unit in order to output the correction chart; and
a density unevenness correction unit for correcting density unevenness of each pixel in a main scanning direction for each of the plurality of color image forming units based on the density correction unevenness information input by the operation unit;
a switching unit for switching invalid or valid of a correction function of the density unevenness correction unit for each of the plurality of color image forming units according to instruction information indicating invalid or valid of the correction function of the density unevenness correction unit for each of the plurality of color image forming units, wherein
the density correction instruction information includes the instruction information indicating invalid or valid of the correction function of the density unevenness correction unit for each of the plurality of color image forming units, and
the control unit generates all images for correction for colors of the images to be formed by the plurality of color image forming units when the correction function of the density unevenness correction unit is set invalid by the switching unit for all of the plurality of color image forming units.

12. The image forming apparatus according to claim 11, wherein the control unit generates the image for correction for color of an image to be formed by the color image forming unit whose density correction instruction information has been changed when any of the density correction instruction information of the plurality of color image forming units is changed.

13. The image forming apparatus according to claim 12, wherein the control unit generates the image for correction for color to be obtained by using, as component color, the color of the image to be formed by the color image forming unit whose density correction instruction information has been changed when any of the density correction instruction information of the plurality of color image forming units is changed.

14. The image forming apparatus according to claim 11, wherein the density correction instruction information includes a correction value for each of the plurality of color image forming units, and the control unit generates all images for corrections for colors of images to be formed by the plurality of color image forming units respectively when all the correction values are zero.

15. The image forming apparatus according to claim 14, wherein the control unit generates an image for correction for color obtained by using as component colors, the colors of the images to be formed by the plurality of color image forming units when all the correction values are zero.

16. The image forming apparatus according to claim 11, wherein the control unit generates the image for correction for color obtained by using, as component colors, the colors of the images to be formed by the plurality of color image forming units when the correction function of the density unevenness correction unit is set invalid by the switching unit for all of the plurality of color image forming units.

17. The image forming apparatus according to claim 11, further comprising
a color designation unit for inputting color designation information for designating color of the image for correction, wherein
the control unit generates the image for correction for color indicated by the color designation information inputted by the color designation unit when the color designation information is inputted by the color designation unit.

18. The image forming apparatus according to claim 17, further comprising
an informing unit, wherein
the control unit generates a message inquiring whether the correction chart is outputted or not, and causing the informing unit to inform the message according to a comparison result obtained by comparing the color indicated by the color designation information inputted by the color designation unit with the color of the image to be formed by the color image forming unit the density correction instruction information of which has been changed when any of the density correction instruction information of the plurality of color image forming units is changed and the color designation information is inputted by the color designation unit.

19. The image forming apparatus according to claim 17, wherein the control unit generates all images for correction for colors of images to be formed by the plurality of color image forming units respectively and generates an image for correction for color obtained by using, as component colors, the colors of the images to be formed by the plurality of color image forming units when none of the density correction instruction information of the plurality of color image forming units are changed and when the color designation information is not inputted by the color designation unit.

20. The image forming apparatus according to claim 17, wherein the control unit generates the image for correction for color of an image to be formed by the color image forming unit whose density correction instruction information has been changed and generates the image for correction for color obtained by using, as component color, the color of the image to be formed by the color image forming unit whose density correction instruction information has been changed when any of the density correction instruction information of the plurality of color image forming units is changed and when the color designation information is not inputted by the color designation unit.

21. A density correcting method for correcting density unevenness in a main scanning direction based on a correction value in an image forming apparatus including a plurality of color image forming units, comprising:

receiving an input of density correction instruction information that includes a correction value for each of the plurality of color image forming units;
storing the correction value included in the input density correction instruction information;
determining color of one or more images for correction according to the input density correction instruction information, generating the image for correction for the determined color, and outputting a correction chart by forming the image for correction for each color on a different paper; and
generating all images for correction for colors of images to be formed by the plurality of color image forming units respectively when all the correction values are zero.

22. A density correcting method for correcting density unevenness in a main scanning direction based on a correction value in an image forming apparatus including a plurality of color image forming units, comprising:
receiving an input of density correction instruction information for at least one of the plurality of image forming units;
storing the correction value included in the input density correction instruction information;
determining color of one or more images for correction according to the input density correction instruction information, generating the image for correction for the determined color, and outputting a correction chart by forming the image for correction for each color on a different paper;
switching invalid or valid of a correction function for each of the plurality of color image forming units according to instruction information indicating invalid or valid of the correction function for each of the plurality of color image forming units, wherein the density correction instruction information includes the instruction information indicating invalid or valid of the correction for each of the plurality of color image forming units; and
generating all images for correction for colors of the images to be formed by the plurality of color image forming units when the correction function is set invalid by the switching unit for all of the plurality of color image forming units.

* * * * *